T. CRANEY.
Saw-Mill Dogs.
No. 223,997.   Patented Feb. 3, 1880.
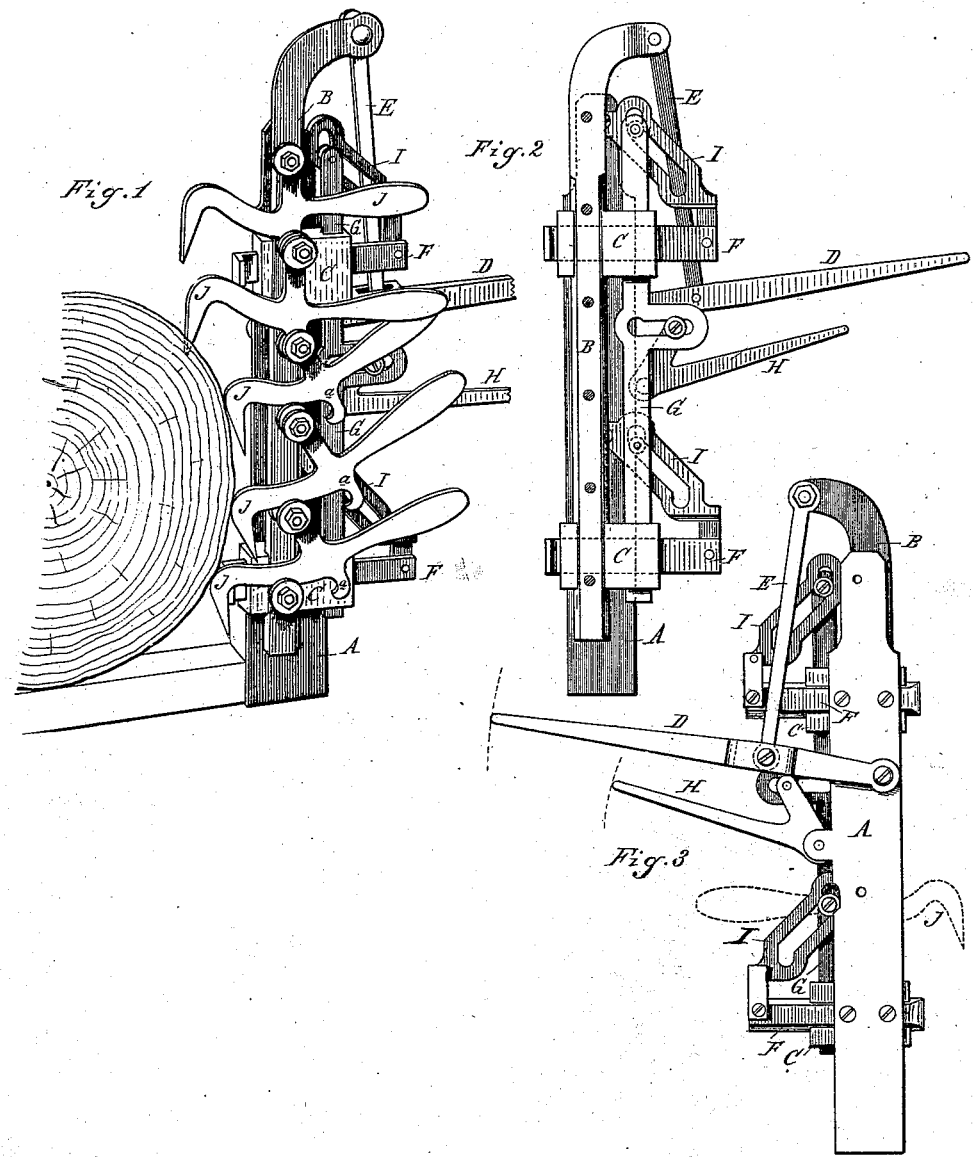

UNITED STATES PATENT OFFICE.

THOMAS CRANEY, OF BAY CITY, MICHIGAN.

SAW-MILL DOG.

SPECIFICATION forming part of Letters Patent No. 223,997, dated February 3, 1880.

Application filed June 16, 1879.

*To all whom it may concern:*

Be it known that I, THOMAS CRANEY, of Bay City, in the county of Bay and State of Michigan, have invented an Improvement in Saw-Mill Dogs, of which the following is a specification.

The nature of my invention relates to certain new and useful improvements in the construction of that class of saw-mill dogs which are usually employed in connection with set-works or head-works of circular-saw mills.

The invention consists in the peculiar swinging dogs pivoted on a bar having independent vertical and lateral movements, each dog being provided with a downwardly-projecting hook engaging with the pivot-bolt of the dog next below, as fully hereinafter explained.

Figure 1 is a perspective view of my improved dog in operation, wherein the lower dogs are thrown back, while one of the upper dogs engages with the log. Fig. 2 is a side elevation with the dogs removed, and showing the means employed for retracting the dogs when employed to hold a cant and for projecting them when employed to hold a round log. Fig. 3 is an elevation of the reverse side.

Like letters indicate like parts in each figure.

In the drawings, A represents a plate, which may be rigidly secured to the knee or other convenient part of the set-works. B is a vertical bar, having a vertical motion in the slides C by means of the lever D and connecting-rod E, the upper end of which is attached to the overhanging end of said bar. To the outer side of this bar are secured the dogs, as hereinafter described. The slides C have a lateral motion upon the lateral slides F.

G is a vertical bar having a vertical motion in mortises in the first-named slides C, and a vertical motion being given to said bar G by means of a lever, H. As this bar has a vertical motion, which it is desired to convert into a lateral motion of the bar B, diagonally-slotted slides I are secured to the plate A, and the bar G is provided with friction-studs, which traverse the slots in said slides, and the device is adapted to project or retract the bar B as the bar G is raised or lowered by the lever H.

A series of dogs, J, constructed substantially in the form shown, are pivoted to the vertical bar B, and are so constructed that the heavier part of said dogs is in rear of their point of pivot, in order at all times to keep them in the position shown in the upper dogs in Fig. 1, while they are free at all times to be thrown back by the impingement of the log against the knee, as shown in the lower dogs in Fig. 1. It will be noticed that each one of these dogs is provided with a small hook, a, which engages with the pivotal bolt upon which the dog next below in the series is supported. This construction prevents the dog which may be brought into use for the time being from being thrown upward when forced into the log or cant by means of the lever D.

In practice, when it is desired to dog a round log, the lever D is raised, which elevates the bar B with the dogs thereto attached, and the lever H is also raised, by means of which the dogs are projected as far beyond the face of the plate or knee as possible. The log being rolled onto the carriage and against the knee, the belly of said log will strike against the outer ends of the lower dogs and throw them back, as shown in Fig. 1, when the lever D is thrown down, thereby forcing the dog next immediate above the log into it. A reverse motion of the lever D disengages them.

When it is desired to dog a cant, the operation above described is repeated, except that the lever H is thrown down, by means of which the bar B, with its attached dogs, is retracted, and by this means the cant may be dogged upon the edge next the knees, so that it may be sawed up to the last inch-board.

In circular-saw mills it is customary to employ bail or other dogs for holding the round log while being slabbed. My invention avoids this necessity, as it will be seen that my dogs can be employed with equal facility in holding either logs or cants.

What I claim as my invention is—

The series of saw-mill dogs J, independently pivoted one above the other on a vertically and horizontally moving bar, each of said dogs having a hook, a, engaging with the pivot-bolt of the dog next below, substantially as described and shown.

THOMAS CRANEY.

Witnesses:
H. S. SPRAGUE,
A. BARTHEL.